Sept. 7, 1965 A. K. CHITAYAT ET AL 3,204,886
FILM LOOP CONTROL FOR VIEWER
Filed Jan. 14, 1963 3 Sheets-Sheet 1

INVENTOR.
ANWAR K. CHITAYAT
WILLIAM W. BURNHAM
BY

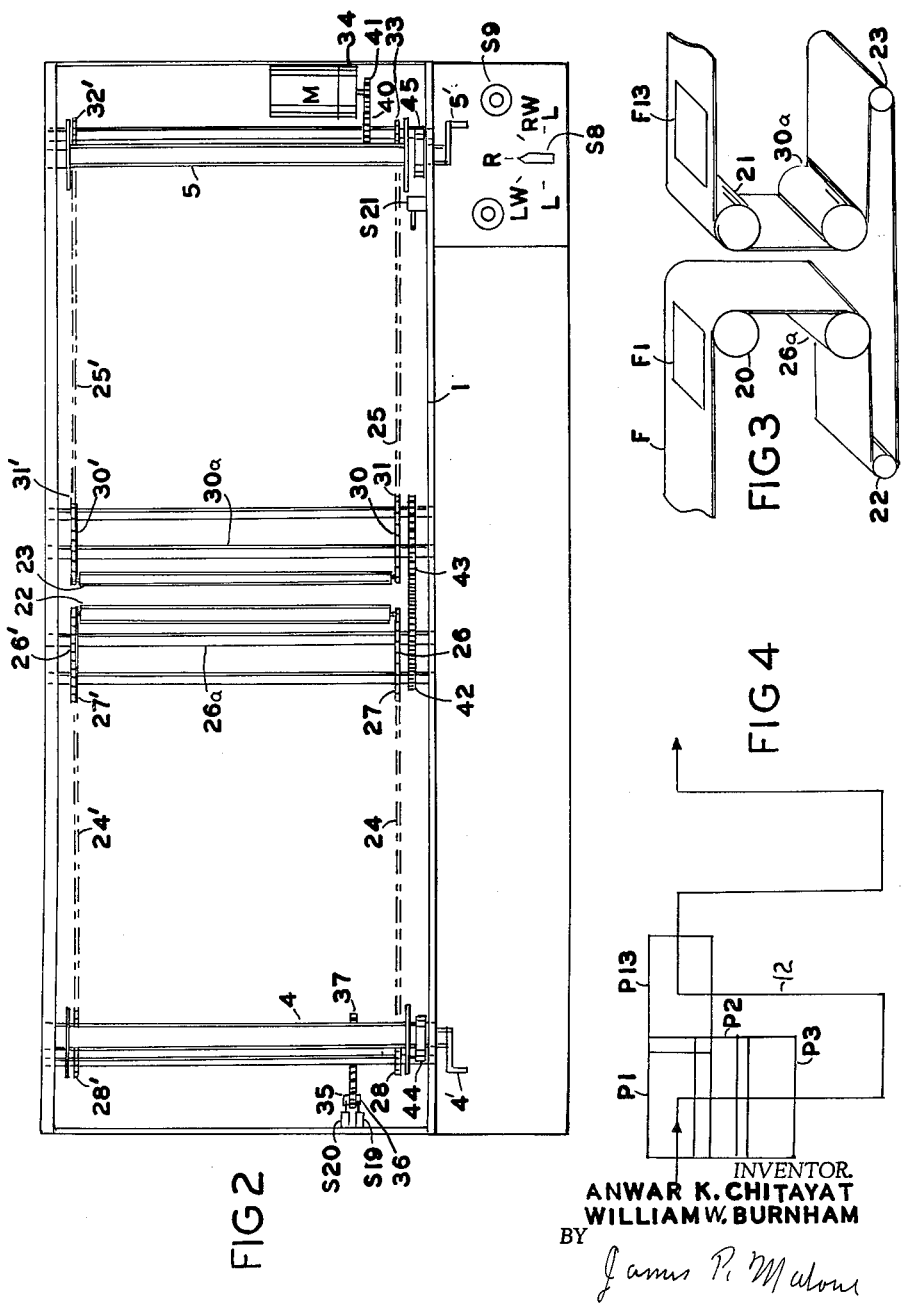

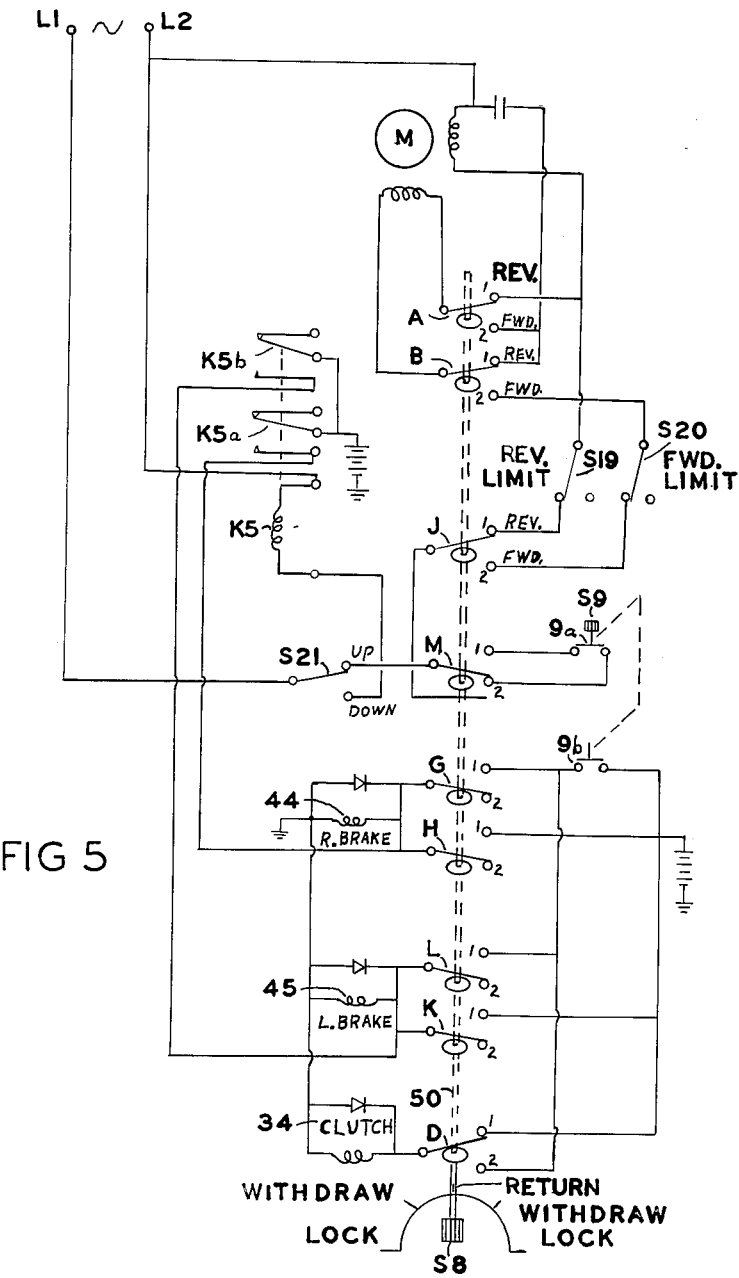
FIG 5
FIG 5A
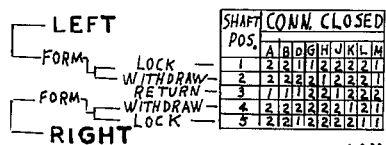
INVENTORS
ANWAR K. CHITAYAT
WILLIAM W. BURNHAM

United States Patent Office 3,204,886
Patented Sept. 7, 1965

3,204,886
FILM LOOP CONTROL FOR VIEWER
Anwar K. Chitayat, Plainview, and William W. Burnham, Mineola, N.Y., assignors to OPTOmechanisms, Inc., Plainview, N.Y.
Filed Jan. 14, 1963, Ser. No. 251,431
9 Claims. (Cl. 242—55.11)

This invention relates to film viewers of the type used for studying aerial surveys, and more particularly to film loop control means for such viewers.

A viewer of this type is shown in co-pending application entitled Remote Film Viewer, Serial No. 97,480, filed March 22, 1961 now Patent No. 3,143,589. That application shows a viewer for viewing large films for instance, in the measurement and interpretation of aerial photographs and surveys.

The viewer generally comprises a film handling table with suitable readout equipment which may be of the digital type for noting measurements. A film table contains the film, illumination sources, transport mechanisms, the X—Y axis carriages, and mechanical drives required for the coordinate readout. Two objective systems and fiber optic cables transmit the information from the two frames of film to the control table stereo viewing optics.

The control panel contains the eyepieces for viewing as well as all the controls necessary for the operator to view and record the desired portions of the film. This is made possible by using fiber optics to transmit the image from the film to the control table. The above mentioned prior invention is suitable for feeding digital readout means and means for display, control, recording or other utilization of data obtained by the viewer.

One of the problems in utilizing and analysing aerial survey film is that the airplane line of flight generally follows an elongated square wave pattern. In other words, the plane may fly North 2 minutes, East 1 minute, South 2 minutes, East 1 minute, repeating the cycle indefinitely. The pictures are taken in an overlapping relationship so that two pictures of the same object which may be used for stereo study, may be separated by a considerable distance on the film. It is therefore desirable to have means in the viewer for forming and controlling a loop in the film so that two frames may be placed side by side for comparison purposes.

The present invention provides such means generally comprising a first pair of fixed positioned rollers mounted in the center of the viewing table spaced apart a predetermined distance. A pair of movable rollers is adapted to move down between the fixed position rollers to form a loop in the film. In order to form greater size loops, the movable rollers are adapted to move down and also to move sideways near the bottom of the viewer so they will form a film loop having a shape of an inverted T. The movable rollers are mounted on chains which are connected to the frame by means of a plurality of sprockets. A motor drive and controls are provided for the movable rollers so that they may move independently, be locked in any position, or returned automatically to zero position. Brakes are provided to lock the reels so that the loop may be drawn from either reel.

Accordingly a principal object of the invention is to provide new and improved film viewing means.

Another object of the invention is to provide new film means for forming and controlling a loop in a film so that two separate frames may be placed side by side for comparison.

Another object of the invention is to provide new and improved means for forming and controlling a loop in film between input and output reels comprising: motor driven rollers, means to lock said rollers in any position, and means to selectively lock said input and output reels so that the loop may be withdrawn from either reel.

Another object of the invention is to provide new and improved loop forming and controlling means in a viewer of the type having input and output reels comprising: motor driven loop forming rollers, means to lock the rollers in any position, means to selectively lock said input and output reels, limit switch means for said motor drive and film pressure plate control means.

Another object of the invention is to provide new and improved loop forming means comprising: a table, input and output film reels mounted on said table, a first pair of film guide rollers mounted on said table and spaced apart in parallel relationship at the center of said table, a second pair of film guide rollers movably mounted on said table and adapted to be moved down between said first pair of rollers to form a loop in said film, and control means to move said second rollers, in a plurality of modes of operation.

These and other objects of the invention will be apparent in the following specifications and drawings of which:

FIGURE 2 is a top view of the embodiment of FIGURE 1, taken along the lines 2—2 of FIGURE 1.

FIGURE 3 is a schematic view showing the operation of the invention.

FIGURE 4 is a diagram explanatory of the invention.

FIGURE 5 is a schematic circuit diagram.

FIGURE 5A is a chart of switch positions for the circuit of FIGURE 5.

Figure 1:
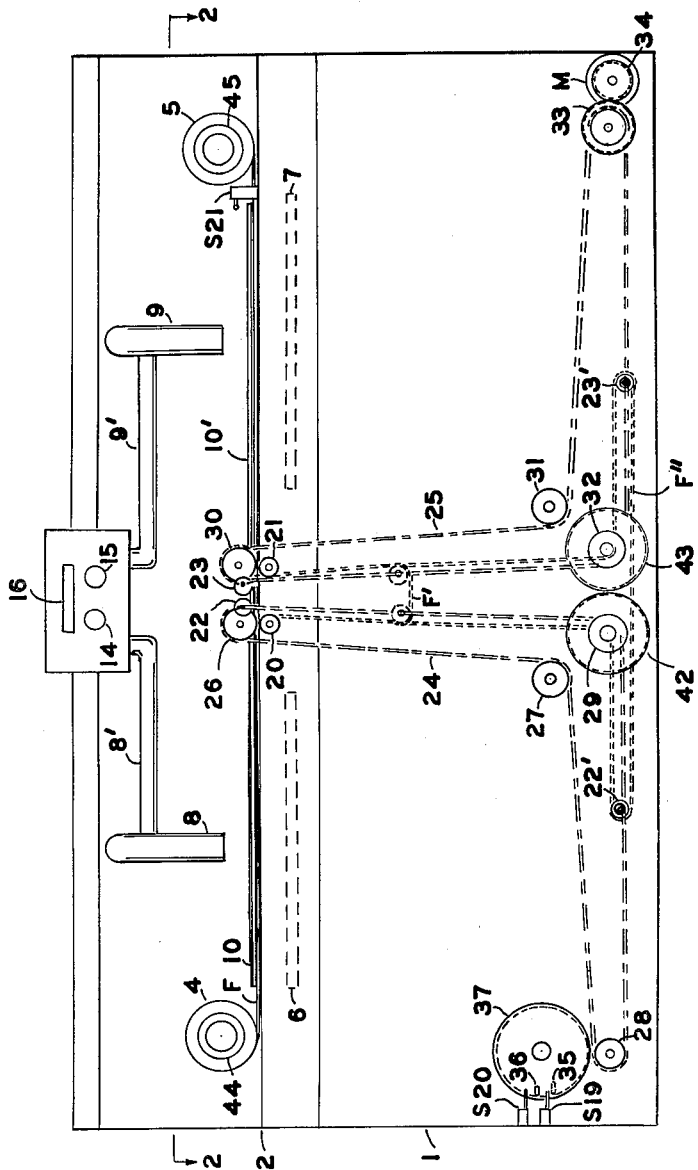
FIGURE 1 is a front view of the embodiment of the invention with the cover removed.

Referring to the figures, FIGURE 1 shows a viewer for viewing a roll of film comprising a frame 1, having a viewing table 2 along which the film F is passed between reel 4 and reel 5 which are rotatably mounted on the frame, as described in my co-pending application. The viewer has light sources 6 and 7 under the viewing table 2, which is transparent so that the film may be viewed by movable pickup means 8 and 9 which are outside the scope of the present invention, such as shown in my above mentioned application. Transparent pressure plates 10 and 10' are preferably pivotally mounted on the frame to press down on the film viewing.

The viewer uses stereo eyepieces 14 and 15 while resting his forehead against the head rest 16. The eyepieces are connected to the scanning pickups 8 and 9 by means of the flexible fiber optic cables 8' and 9'. The details of the scanning mechanism are not shown as they are outside the scope of the present invention and may be shown as in the previously mentioned patent application.

All of the above mentioned apparatus is outside the scope of the present application and may be as shown in the previous above mentioned application.

The present invention is directed to the problem illustrated in FIGURE 4, which illustrates the flight path of an airplane taking pictures P1, P2, P3, P13 and so forth. The plane normally flies a pattern 12, which is an elongated square wave pattern. For instance, the plane may fly North 2 minutes East 1 minute, South 2 minutes, West 1 minute and then repeat the cycle taking overlapping pictures as illustrated. The pictures are taken with considerable overlapping for stereo viewing purposes.

If it is desired to compare two pictures for instance, F1 and F13, FIGURE 3, it is necessary to form a loop in the film F as these pictures are separated on the film by a considerable number of frames.

FIGURE 3 is a schematic view illustrating the forming of a loop L in the film to bring the desired pictures F1 and F13 into proximity on the viewing table so that one of them may be viewed in the pickup 8 and the other with the pickup 9 for stereo viewing.

Referring back to FIGURE 1, the loop forming means is as follows:

The film passes from the reel 4 to the reel 5 over a pair of centrally located rollers 20 and 21 which are spaced apart an equal amount on the viewing table. The rollers 20 and 21 are rotatably mounted on the viewing table in fixed positions. The loop is formed by a pair of rollers 22 and 23 which are mounted on chains 24 and 25. The chain 24 is mounted on sprockets 26, 27, 28, and 29 which are rotatably mounted on the frame. There is a corresponding chain 24′, FIGURE 2, with corresponding sprockets 26′, 27′, 28′, etc., to support the other end of the roller 22.

Chain 25 and corresponding chain 25′ are mounted on the other side of the viewer by means of sprockets 30, 31, 32 and 33. Chain 25′ is mounted on sprockets 30′, 31′, 32′, and so forth. Therefore, by moving the rollers 22 and 23 by means of the chain a film may be drawn down on the bottom and then to the left and right to form a loop with an inverted T.

Limiting switches S20 and S19 are provided to stop the chain drive at the maximum amount of chain travel.

These switches are operated by projections 35 and 36 mounted on either side of the gear 37, which is rotatably mounted on the frame and geared to the chain sprocket 28 so that as the loop approaches its maximum and minimum points, the switches S20 and S19 will turn off the motor M as described in connection with the control circuit of FIGURE 5.

The motor M is connected to magnetic clutch 34 which is geared to the chain drive by means of the gears 40 and 41. The left and right chains are geared together by means of gears 42 and 43 which are mounted on the shafts of sprockets 29 and 32.

Magnetic brakes 44 and 45 are connected to the reels 4 and 5 in order to selectively lock one of the reels, so that the film may be drawn from the other reel as will be explained in connection with the control circuit in FIGURE 5. The reels 4 and 5 are adapted to be manually controlled by the handles 4′ and 5′.

Therefore, by energizing the chain drive, the rollers 22 and 23, which normally rest above the film, are drawn down for forming a loop F′ in the film with substantially perpendicular sides. As the loop is increased the rollers will form an inverted T loop F″ which may be extended all the way over to the sprockets 28 and 33, where the travel will be stopped by means of the switch S20.

The rollers may be returned to their normal position and automatically stopped by the reverse switch S19. The size of the gear 37 and its gear ratio is chosen to provide the desired amount of travel.

The system has various modes of operations for instance, either reel may be locked to withdraw film from the other reel, the sprockets may be locked at any position so that the film may be passed through a given size loop continuously. The different modes of operations will be described in connection with the control circuit of FIGURE 5.

The five position switch S8 controls the different modes of the loop forming mechanisms. This switch contains nine cams and nine single pole double throw switches actuated as in the table shown in FIGURE 5A. The nomenclature "1" is used to show contacts marked No. 1 closed to common, and nomenclature "2" is used to show contact No. 2 closed to common. The schematic diagram FIGURE 5 shows the circuits when the switch is in "Return" position.

The loop drive motor M drives the chain to effect the movement of the loop forming rollers to effect the size of the loop. In the "return" position, the motor M is driven in reverse automatically until it is de-energized by the limit switch S19. In all the other positions of the switch "manual withdraw" and "lock," the motor can be driven only in the forward direction through the push button "form loop" switch S9.

The loop clutch 34 is actuated by S8 in the positions "lock" and "return." In the "right withdraw" position No. 4, the left brake 44 is energized. In the "left withdraw" position the right brake 45 is on.

More specifically referring to FIGURE 5, there is shown a schematic circuit diagram of the electrical control system. The control switch S8 has a plurality of contacts A, B, J, M, G, H, L, K, D, which are operated by a plurality of corresponding cams on cam shaft 50 which is connected to knob of switch S8. The other panel control is push button 9 for switches S9A and S9B.

The switch has five positions for five different modes of operation namely, "left lock," "left manual withdraw," "return," "right manual withdraw," and "right lock." FIGURE 5A shows in chart form connections which are made in the five different positions. For instance, in position "left lock," contacts No. 2 of A, B, H, J, K, and L, are closed to the common terminal and contacts No. 1 of D, G, and M are closed to the common terminal.

The circuit in FIGURE 5 shows the switch in the "return" position.

The loop drive motor M drives the chain to cause the movement of the loop forming rollers to effect the size of the loop. In the "return" position, the motor M is driven in reverse by motor M automatically until it is de-energized by the reverse limit switch S19. In all the other positions of the switch "manual withdraw," and "lock" the motor can be driven only in the forward direction through the push button switch S9.

The loop clutch 34 is actuated by S8 in the positions "lock" and "return." In the "right withdraw" position the left reel 44 is energized. During the "left withdraw" position, the right reel brake 45 is on.

Relay K5 provides the interlock to prevent damage of the film. The switch S21 senses the pressure plate 10 and 10′ so that when it is down (film sandwiched), the relay K5 contacts K5a, K5b energized via S21 which places voltage across the right and left reel brakes 44 and 45. In addition, the voltage is removed from the film loop motor M by S21.

In operation the loop forming switch S8 contains five positions:

(1) Lock left: In this position, the driving sprockets are locked at the last switch setting actuating clutch 34 permitting the film to be manually driven either to the right or to the left without effecting the length of the film. A loop may also be formed at this position.

(2) Manual withdraw (left): In this position, the right spool and drive are braked, by brake 45, into position; consequently, if the operator turns the left drive handle 4′, it will pull the film to the left reducing the size of the loop. Here, when the form loop push button switch 9 is depressed, the motorized drive increases the loop from the left side.

(3) Return: This position is used to return the loop forming rollers, when there is no film in the machine. The rollers are driven up automatically until they are in zero-loop position.

(4) Manual withdraw (right): This is the same as position 2, except that now the left spool is braked, and the film loop can either be increased by depressing form loop 9 or decreased manually with handle 5′.

(5) lock right: This is the same as position 1.

The steps taken in forming the loop are as follows:

First, put pressure plate up in order to remove the interlock S21 and allow film movement. Then, a choice can be made to whether the loop should be formed from the right or left. If the loop should be formed from the right then place the switch 8 on "manual withdraw, right" and depress "form loop" switch until the desired loop length is achieved. Now, place the switch in "lock" position, in order to maintain the same length of the loop. The right or left film drive handles can now be operated with a constant length film loop.

Now, if it is desired to reduce the loop, the operator may place the controls on either "manual withdraw right" or "manual withdraw left"; in this position the film loop withdrawal can be manually made by rotating the right or left film drive handles respectively.

Therefore, this invention provides a film handling facility whereby a loop can be formed between adjacent viewing areas containing as much as eleven feet of film in a typical embodiment. Controls for the loop forming mechanisms are located on the control panel and consist of a mode selector switch and a push button switch. The modes of operation are essentially "loop forming," "holding a fixed loop length" and "loop withdrawal." Except for "loop withdrawal," all functions are electrically driven or actuated. Manual withdrawal of loop is performed by rewinding film onto either of the spools with the choice up to the operator. The mode selector switch will direct the mechanism from which channel the film is to be withdrawn for the loop.

Once the channel is selected, a choice to use the "manual withdraw" or "lock" modes can be made. A loop may be formed in either position; the purpose of the choice will be whether the operator wishes to form and withdraw the loop or to form and hold the loop respectively. The mode selector may be moved after the loop has been formed to any position, if the operator decides to change withdrawal from the other channel or wishes to change length of loop held in storage.

The loop forming mechanism consists of a pair of rollers attached to parallel chain circuits that are coupled by interconnected sprockets. When not forming a loop the rollers are above the film plane between the viewing areas. In operation, after the pressure plate is raised, the lower roller of the pair makes contact with the film drawing it between two fixed free-turning rollers that form a slot and protect the film during the loop forming operation. As the moving rollers travel downward the loop length increases. At the "knee" of the chain circuit the pair of moving rollers separate and begin to travel in opposite directions enlarging the loop into an inverted T. The limit is reached when moving rollers reach the end sprockets where the loop forming drive motor is shut off by a limit switch. Free-turning fixed rollers for instance, on the shafts of sprockets 29 and 32 support and protect the film as it turns from vertical to horizontal paths at the T and preferably midway under the long span between the limit sprockets.

To retract or withdraw the film loop, raise the pressure plate and rotate the film winding handle of the selected channel as to be turned to wind film on the spool. The opposite spool will be braked by a magnetic brake on the opposite film drive. Tension in the film will return the forming rollers on the path they took in forming the loop. If desired, the withdrawal process may be stopped at any point and the pressure plate lowered to return to viewing of the film strip.

An electrical interlock between the pressure plate and the film transport or loop forming operation is made so that when the pressure plate is lowered to sandwich the film, the manual, and electrical drive mechanisms are braked or inoperable. In this manner film damage through faulty operation is minimized.

We claim:

1. In a film viewer of the type used for studying film of aerial surveys, means for forming and manipulating a loop in said film so that frames of said film separated by a plurality of frames may be placed side by side for comparison comprising, a table, input and output film reels mounted on said table, a first pair of film guide rollers mounted on said table and spaced apart in parallel relationship at the center of said table, a second pair of film guide rollers movably mounted on said table, means to move said movable rollers down between and substantially past said first pair of rollers to form a single loop in said film, means to move said second pair of rollers, wherein said means to move said second pair of rollers comprises a pair of chains each mounting one of said second pair of rollers, a plurality of sprockets mounting said chains and motor means connected to said sprockets to move said chains and said second pair of rollers.

2. Apparatus as in claim 1 whereby said second pair of rollers are adapted to move vertically a predetermined distance and then horizontally a predetermined distance thereby forming a loop in said film having an inverted T shape.

3. Apparatus as in claim 2, having separate control means connected to move said rollers of said second pair of rollers separately.

4. In a film viewer of the type used for studying film of aerial surveys, means for forming and manipulating a loop in said film so that separated frames of said film may be placed side by side for comparison comprising; a table, a first pair of film guide rollers mounted on said table and spaced apart in parallel relationship at the center of said table, a second pair of film guide rollers movably mounted on said table and adapted to be moved down between said pair of rollers to form a loop in said film and means to move said second pair of rollers comprising a pair of chains each mounting one of said rollers, a plurality of sprocket mounting said chains and motor means connected to said sprockets to move said chains and said second pair of rollers.

5. In a film viewer of the type used for studying film of aerial surveys, means for forming and manipulating a loop in said film so that separated frames of said film may be placed side by side for comparison comprising; a table, a first pair of film guide rollers mounted on said table spaced apart in parallel relationship at the center of said table, a second pair of film guide rollers movably mounted on said table and adapted to be moved down between said pair of rollers to form a loop in said film and means to move second pair of rollers comprising, a pair of chains each mounting one of said rollers, a plurality of sprockets mounting said chains and motor means connected to said sprockets to move said chains and said pair of rollers, said chains being adapted to move vertically a predetermined distance and horizontally a predetermined distance thereby forming a loop in said film having the shape of an inverted T, said motor means including clutch means connected to lock said rollers of said second pair of rollers at any position.

6. In a film viewer of the type used for studying film aerial surveys, means for forming and manipulating a loop in said film so that separated frames of said film may be placed side by side for comparison comprising; a table, input and output film reels mounted on said table, brake means connected to said input and output film reels, a first pair of film guide rollers mounted on said table and spaced apart in parallel relationship at the center of said table, a second pair of film guide rollers movably mounted on said table and adapted to be moved down between said first pair of rollers to form a loop in said film, means to move said second pair of rollers, and means to lock said rollers in position.

7. Apparatus as in claim 6 whereby said means to move said second pair of rollers comprises a pair of chains each mounting one of said rollers, a plurality of sprockets mounting said chains, and motor means connected to said sprockets to move said chains and said second pair of rollers.

8. In a film viewer of the type used for studying film of aerial surveys, means for forming and manipulating a loop in said film so that separated frames of said film may be placed side by side for comparison comprising; a table, input and output reels on said table, a first pair of film guide rollers mounted on said table and spaced apart in parallel relationship at the center of said table, a second pair of film guide rollers movably mounted on said table and adapted to be moved down between said pair of rollers to form a loop in said film, and means to move second pair of rollers comprising, a pair of chains each mounting one of said rollers, a plurality of sprockets mounting said chains, motor means connected to said sprockets to move said chains and said pair of rollers, said chains being adapted to move vertically a predetermined distance and horizontally a predetermined distance thereby forming a loop in said film having the shape of an inverted T, said motor means including clutch means connected to lock said rollers of said second pair of rollers at any position, and brake means connected to selectively lock one of said reels.

9. Apparatus as in claim 8 having mode switch means connected to said motor, said clutch and said brakes to selectively energize said motor, said clutch and said brakes to lock said loop in any position, and to form and withdraw a loop from and to either and both of said input and output reels.

References Cited by the Examiner
UNITED STATES PATENTS
2,814,966  12/57  Crossley _____ 88—31

FOREIGN PATENTS
344,344  3/31  Great Britain.

RUSSELL C. MADER, *Primary Examiner.*
MERVIN STEIN, *Examiner.*